May 26, 1970     J. C. MONAHAN     3,514,114
MULTIPLE SEALING MEANS
Filed Nov. 9, 1967
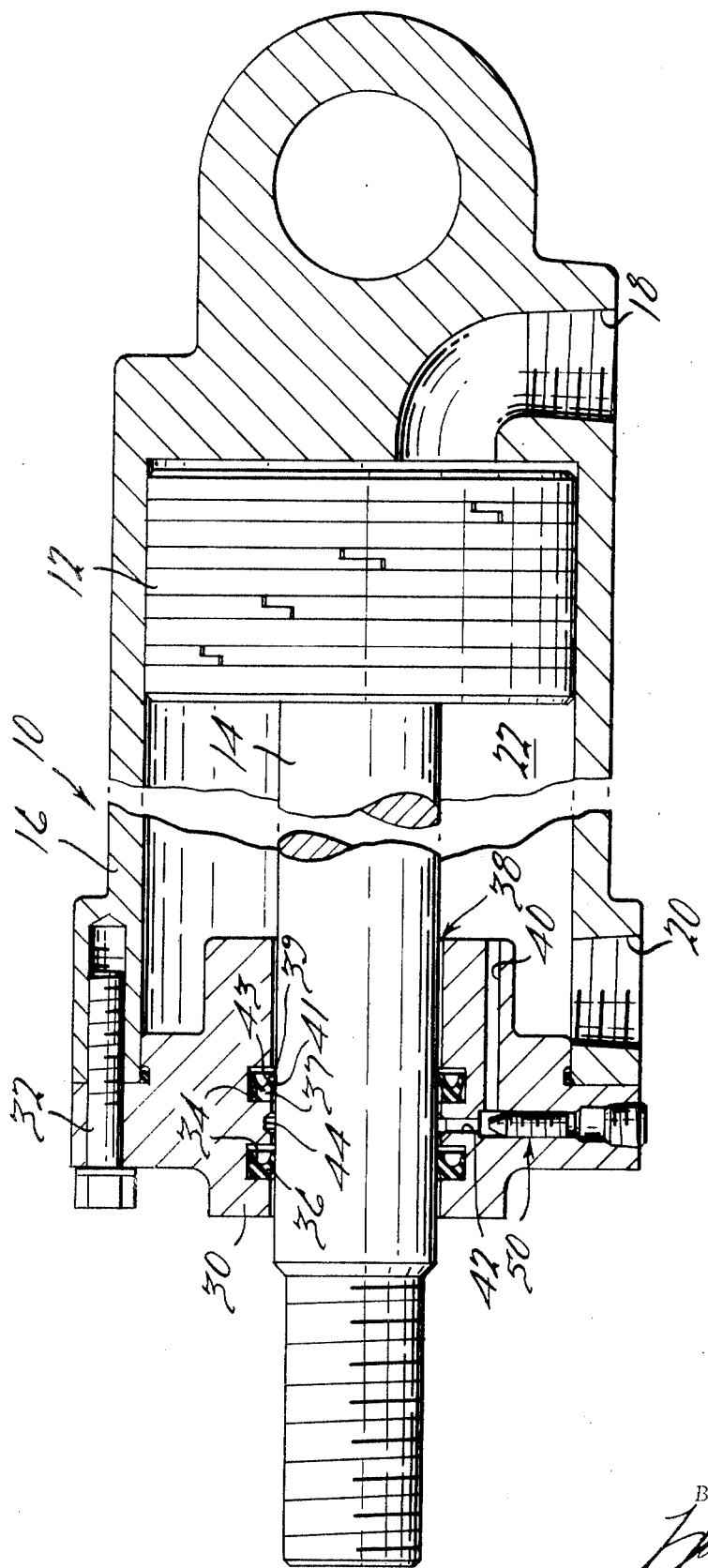
INVENTOR.
John C. Monahan
BY
Harness, Dickey & Pierce
ATTORNEYS

United States Patent Office 3,514,114
Patented May 26, 1970

3,514,114
MULTIPLE SEALING MEANS
John C. Monahan, 16780 Ego Ave.,
East Detroit, Mich. 48021
Filed Nov. 9, 1967, Ser. No. 681,741
Int. Cl. F16j 15/40
U.S. Cl. 277—3
7 Claims

ABSTRACT OF THE DISCLOSURE

A multiple sealing system particularly for a fluid actuated piston rod comprising a plurality of flexible seals to prevent leakage between the rod and a housing collar which holds the rod for sliding movement into and out of a pressure chamber containing pressurized fluid, with the outermost of said seals acting first in succession to prevent leakage while the remaining seal or seals are integrally held inactive in reserve until the first seal fails, whereupon the remaining seals are successively brought into engagement by controllably altering the force of the pressurized fluid on the remaining seals.

Background of the invention

This invention broadly relates to a multiple sealing system. More specifically it relates to a multiple sealing system for a fluid actuated device having a piston rod which passes through a housing collar and wherein it is desired to prevent leakage of fluid between the rod and the collar.

Prior art U.S. patents only generally related to this disclosure are as follows: 2,815,970; 2,979,350; 3,186,723; 1,831,136; 1,766,706; 1,572,922; 3,259,392; 2,971,783; and 3,030,118.

In the past in fluid actuated devices having a ram or rod which is extended or retracted by a fluid pressure, one or more sealing rings or the like were used in corresponding annular recesses of the housing collar through which the rod was reciprocated. In these prior sealing systems, the seal closest to the pressure chamber usually performed all of the sealing action until it began to leak at which time the next successive seal was supposed to stop the leakage and so on. However, often the next successive seal had already been subject to the same force of pressurized fluid as the first seal and also since the next successive seal had not received any substantial lubrication from the actuating fluid it would therefore as a result be well worn or worn out altogether by the time of failure of the first seal.

Accordingly, it is an object of this invention to provide an improved multiple sealing system for use with reciprocating rods, reciprocating pistons, rotating shafts, rotating housings, and the like.

Another object of the present invention is to provide an improved multiple sealing system for use with devices having a ram or rod which reciprocates or rotates in sliding movement through a housing collar, with the sealing system acting to prevent leakage between the ram or rod and the collar.

Other features and advantages of the present invention will become apparent from the subsequent description and the appended claims taken in conjunction with the accompanying drawing.

Brief description of the drawing

The drawing illustrates a partially cutaway view of a fluid actuated device which includes the multiple sealing system of this invention.

Summary of the invention

Broadly stated, this invention comprises a multiple sealing device including a collar-like housing with an opening therethrough, rod, ram, or shaft means extending through the housing in movable relationship thereto, a plurality of recesses within said housing and disposed generally about the opening, at least two sealing means disposed generally within the recesses for providing a sealing action against passage of relatively pressurized fluid from an interior relatively pressurized side of said housing to the exterior thereof, and means for conducting a part of the fluid from the interior side of the housing to at least one position intermediate said sealing means and generally next to said shaft means to thereby provide a first sealing activation of the sealing means closest to said exterior and then successive activation of the remaining sealing means.

Description of preferred embodiments

The drawing shows a preferred form of the multiple sealing system disclosed herein but they are illustrative only and should not be taken as a limitation on the invention described hereinafter.

The drawing shows a fluid actuated device 10 with a ram or piston rod 14 mounted within a housing chamber 16 which as shown forms the body of the device 10. The housing chamber 18 contains an inlet-outlet port 18 and a corresponding inlet-outlet port 20 which ports 18 and 20 act correspondingly to either admit or exit an activating fluid to the pressure chamber 22 and thereby either extend or retract the piston 12 by means of the fluid pressure.

A housing collar 30 is disposed at one end of the chamber 22 and, as shown, it is attached to the housing chamber 16 by one or more threaded bolts designated 32 or any other suitable attaching means.

A plurality of recesses 34, two as shown in the drawing, are positioned in the collar 30 to thereby form what may be termed annular grooves or the like. Circular seals 36 and 37 are shown disposed within the recesses or annular channels 34 to prevent leakage of pressurized fluid from the chamber 22 through the space designated 38 between the piston rod 14 and housing collar 30.

A conduit 40 is also shown disposed within the housing and the conduit 40 is in communication with a conduit 42 to allow for the passage of fluid from the chamber 22 to pass into the annular groove 44 which surrounds the piston rod 14, thereby enabling the fluid passing through the conduits 40, 42 to surround the rod 14 and be uniformly distributed thereabout.

A needle valve designated 50 is shown disposed intermediate the conduits 40 and 42 and the needle valve provides for the shutting off of fluid flow from the chamber 22 through the conduits 40 and 42.

The multiple sealing system of the invention operates as follows.

Seal 36, which is the outermost or first seal, is exposed on one side to fluid pressure from the chamber 22 through the conduits 40 and 42. The next successive seal 37 is exposed on all sides to fluid pressure from the chamber 22 because this fluid pressure reaches the seal 37 not only through the relatively slight space designated 38 on the one side but also the fluid from the chamber 22 reaches the other side of the seal 37 by passage through the conduits 40 and 42 from which it is uniformly distributed about the rod due to the presence of the annular groove 44. Due to the fluid pressure on both sides of the seal 37 it does not distort under the balanced pressure and thus there is virtually no friction or sealing action created at seal 37, and hence the wear on seal 37 is substantially negligible at the start of the sealing action. When the seal 36 begins to wear out and leak, the needle valve 50 is used to cut off the fluid pressure supply thus causing seal 37 to replace seal 36 as the effective seal, because shutting the needle valve leaves seal 37 with fluid pressure on one side only; that is, pressure through the space 38.

As can be seen from the shape of the seals in the drawing when there is fluid pressure on both sides of the seal, for example, seal 37, then the flange 39 which would normally contact the rod 14 does not do so with any significant force because the pressure on the side 41 of the flange 39 is substantially equal to the pressure on the side 43 thereof. Therefore, the seal is placed in what effectively could be called a "floating" action. However, when the fluid pressure supply through the conduits 40, 42 is shut off then the fluid pressure no longer exerts a force on the side 41, but the fluid pressure passing through the space 38 is still exerted on the side 43 of the flange 41, and hence the flange is pressed into sealing engagement with the rod 14.

Of course seals and needle valves in any multiples can be used. Furthermore, additional conduits for the passage of fluid from the chamber 22 to a position intermediate the seals such as indicated at the ends of groove 44 may also be used in order to provide for a more rapid or even distribution of fluid pressure.

Still further, alternative cross sectional shapes of seals may be utilized in this invention as opposed to the type of seals used in the drawing. For example, hollow seals may be used such that when there is pressure on all sides of the seal the seal configuration remains uniform so that it does not contact the moving surface of the piston rod 14. On the other hand when the fluid pressure from the chamber 22 contacts one side only of a hollow seal then its surface would distort such that its surface would come into sealing contact with the rod 14.

Lastly, it should be readily apparent that alternative embodiments of the shape, composition, and construction of the seals and grooves or cavities would be possible without departing from the scope of this invention.

In accordance with all of the above description of this invention the advantages thereof should be apparent. These advantages are that the sealing device farthest away from the pressure chamber is exposed to full pressure on one side and thus becomes the only effective seal; whereas the other seals are exposed to pressure on all sides and hence fully exposed to lubrication by the actuating fluid, but not subject to friction and wear. Further, the seals may be designed to lose contact with the moving surface of the piston rod by using suitable shapes, hollow centers, special sealing flanges, and the like. Still further, when the outermost or first effective seal begins to leak (or for any other reason) its fluid supply can be stopped manually or automatically thus causing the next successive seal to become effective, and this may be repeated by as many multiple seals as desired.

What is claimed is:
1. A multiple sealing device comprising
a collar-like housing with an opening therethrough,
reciprocating shaft-like means extending through the housing in reciprocating movable relationship thereto,
a plurality of recesses within said housing and disposed generally about the opening,
at least two flexible resilient sealing means disposed generally within the recesses for providing a sealing action against passage of relatively pressurized fluid from an interior relatively pressurized side of said housing to exterior thereof,
means for conducting a part of the fluid from the interior side of the housing to at least one position intermediate said sealing means and generally next to said shaft-like means to thereby provide for a first sealing activation of the sealing means which is outermost and closest to said exterior, and engaging said reciprocating shaft, and then successive activation of remaining, inner, sealing means.

2. The device of claim 1 wherein
said means for conducting includes
at least one conduit means disposed in said housing for passing the fluid therethrough, and
at least one valve means disposed in said conduit means for controlling fluid flow therethrough.

3. A fluid activated apparatus containing the multiple sealing device of claim 1.

4. A fluid activated apparatus including a multiple sealing device comprising
a housing chamber,
a fluid activated reciprocating piston within said chamber,
a collar-like housing with an opening therethrough,
rod means extending through the housing in reciprocating movable relationship thereto, and in concert with said reciprocating piston,
a plurality of recesses within said housing and disposed generally about the opening,
at least two flexible resilient sealing means disposed generally within the recesses for providing a sealing action against passage of relatively pressurized fluid from an interior relatively pressurized side of said housing to exterior thereof,
means for conducting a part of the fluid from the interior side of the housing to at least one position intermediate said sealing means and generally next to said rod means to thereby provide for a first sealing activation of the sealing means which is outermost and closest to said exterior and then successive activation of remaining, inner, sealing means.

5. In a fluid activated apparatus comprising
a housing chamber, and
a fluid activated piston within said chamber,
the improvement comprising the integral use therewith of a multiple sealing device including
a collar-like housing with an opening therethrough,
rod means extending through the housing in reciprocating movable relationship thereto,
a plurality of recesses within said housing and disposed generally about the opening,
at least two flexible resilient sealing means disposed generally within the recesses for providing a sealing action against passage of relatively pressurized fluid from an interior relatively pressurized side of said housing to exterior thereof,
means for conducting a part of the fluid from the interior side of the housing to at least one position intermediate said sealing means and generally next to said rod means to thereby provide for a first sealing activation of the sealing means which is outermost and closest to said exterior and engaging said reciprocating rod means and then successive activation of remaining, inner, sealing means.

6. A multiple sealing device comprising
a collar-like housing with an opening therethrough,
shaft means extending through the housing in movable relationship thereto,
a plurality of recesses within said housing and disposed generally about the opening,
a resilient sealing means disposed generally within each of the recesses for providing a sealing action against passage of relatively pressurized fluid from an interior relatively pressurized side of said housing to exterior thereof,
means for conducting a part of the fluid from the interior side of the housing to at least one position intermediate said sealing means and generally next to said shaft-like means to thereby provide for a first sealing activation of the sealing means which is outermost and closest to said interior and engaging said shaft means, and then successive activation of remaining, inner, sealing means,
said sealing means including the outermost sealing means and at least one inner sealing means, said inner sealing means being in hydraulic balance by being exposed to fluid pressure on all sides and exposed to lubrication by the fluid until fluid supply to the outermost sealing means with fluid pressure on only one side thereof is stopped, at which time said at least one inner sealing means becomes effective in operation.

7. In a fluid activated apparatus comprising
a housing chamber,
a fluid activating piston within said said chamber, and reciprocating rod means in reciprocating movable relationship to the chamber,
the improvement comprising the integral use therewith of a multiple sealing device including
a collar-like housing with an opening therethrough,
a plurality of recesses within said housing and disposed generally about the opening,
a resilient sealing means disposed generally within each of the recesses for providing a sealing action against passage of relatively pressurized fluid from an interior relatively pressurized side of said housing to exterior thereof,
means for conducting a part of the fluid from the interior side of the housing to at least one position intermediate said sealing means and generally next to said rod means to thereby provide for a first sealing activation of the sealing means which is outermost and closest to said exterior and engaging said rod means and then successive activation of remaining, inner, sealing means,
said sealing means including the outermost sealing means and at least one inner sealing means, said inner sealing means being in hydraulic balance by being exposed to fluid pressure on all sides and exposed to lubrication by the fluid until fluid supply to the outermost sealing means with fluid pressure on only one side thereof is stopped, at which time said at least one inner sealing means becomes effective in operation.

References Cited

UNITED STATES PATENTS

| | | | |
|---|---|---|---|
| 2,300,385 | 10/1942 | Kollberg et al. | 277—9 X |
| 2,979,350 | 4/1961 | Lansky | 277—59 X |

FOREIGN PATENTS 941,241  11/1963  Great Britain.

LAVERNE D. GEIGER, Primary Examiner

J. S. MEDNICK, Assistant Examiner

U.S. Cl. X.R.

277—9, 35, 59, 71

UNITED STATES PATENT OFFICE
CERTIFICATE OF CORRECTION

Patent No. 3,514,114  May 26, 1970

John C. Monahan

It is certified that error appears in the above identified patent and that said Letters Patent are hereby corrected as shown below:

Column 2, line 26, "18", first occurrence, should read -- 16 --. Column 3, line 62, Column 4, lines 20 and 42, cancel "resilient", each occurrence. Column 4, line 61, and Column 5, line 18, "resilient", each occurrence, should read -- flexible --.

Signed and sealed this 12th day of January 1971.

(SEAL)
Attest:

Edward M. Fletcher, Jr.
Attesting Officer

WILLIAM E. SCHUYLER, JR.
Commissioner of Patents